(No Model.)
W. LAKE.
ART OF LAYING UNDERGROUND CONDUITS.
No. 393,477. Patented Nov. 27, 1888.
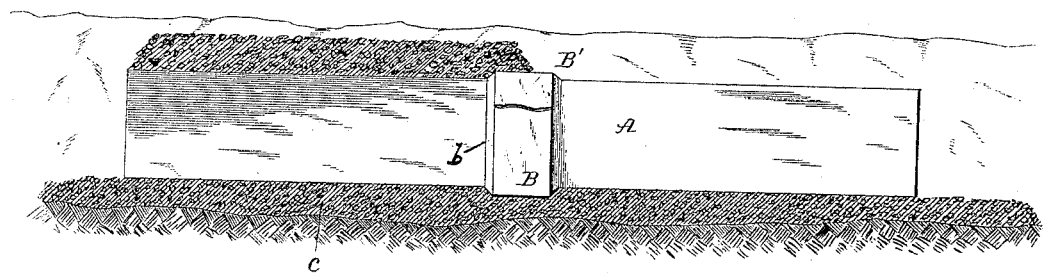
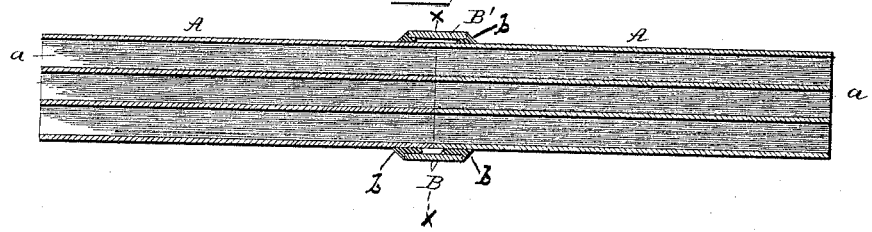
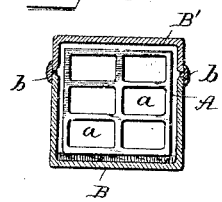
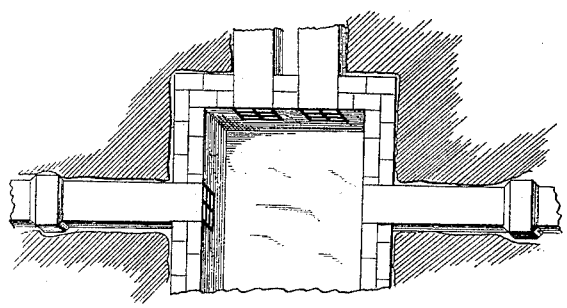
Witnesses.
Edwin L. Bradford,
Wm. M. Stockbridge.
Inventor.
Wilmot Lake.
By his Attorney
V. D. Stockbridge

UNITED STATES PATENT OFFICE.

WILMOT LAKE, OF WASHINGTON, DISTRICT OF COLUMBIA.

ART OF LAYING UNDERGROUND CONDUITS.

SPECIFICATION forming part of Letters Patent No. 393,477, dated November 27, 1888.

Application filed October 3, 1888. Serial No. 257,075. (No specimens.)

*To all whom it may concern:*

Be it known that I, WILMOT LAKE, a citizen of the United States, residing at Washington, in the District of Columbia, have invented certain new and useful Improvements in the Art of Laying Underground Conduits; and I do hereby declare the following to be a full, clear, and exact description of the invention, such as will enable others skilled in the art to which it appertains to make and use the same.

My invention relates to improvements in the art of laying underground conduits for electric-circuit wires and for other purposes.

Terra-cotta or other like material, to which a vitreous surface is imparted and in which cells or perforations are formed, is now an improved material for underground conduits for electric-circuit wires. This conduit is formed in short lengths, which have to be connected together and an impervious joint made and preserved, and by reason of the weight and dimensions of the sections the joints have to be made in the trench in which the conduit is laid. Various ingenious methods of coupling the sections and sealing the joints have been devised, and among them the interposition of a packing or gasket between the abutting ends of the conduit-sections, afterward passing a sleeve over the joint, and finally luting with hydraulic cement to seal said joint. A two-part coupling sleeve or collar intended to be bolted together through flanges has also been proposed for use in forming joints in the trench, the lower section to be partially filled with cement before the cap part is placed in position. In these cases, however, it was manifestly contemplated that the parts or sections of conduit were to be rigidly held and supported from flexure at the joint through the strength of the coupling, and to this end the space between sleeve and conduit was entirely filled with indurating cement, thus necessitating the use of a gasket or packing between the abutting ends of the conduit sections to prevent inflow of cement and the consequent obstruction of the perforations.

In practice I have discovered that it is not necessary or desirable to make a stiff joint or one having great lateral strength, the foundation-support being that which must sustain the conduit if it is sustained at all. A properly-supported cement joint is therefore for all practical purposes equal to the most elaborate contrivance.

The object of my invention is to simplify and reduce the expense of laying terra-cotta and other like impervious conduits, and to this end it consists in the improvement in the art hereinafter particularly pointed out in the claims.

The accompanying drawings, forming a part of this specification, are a graphic representation of my improved process.

In the drawings, Figure 1 is a section of a trench, showing the conduit in elevation. Fig. 2 is a longitudinal section through the joint. Fig. 3 is a plan of man-hole and branch conduits, and Fig. 4 is a section on the line $xx$ of Fig. 2.

A is a block of terra-cotta provided with cells or perforations $aa$, constituting pipe-sections for the conduit.

B and B' are the parts of a two-part sleeve or coupling-collar.

$bb$ is the cement or material for sealing the joint, and $c$ is the grouting material for the bottom of the trench, and which may entirely surround the conduit.

In practice the trench is first dug, and the bottom thereof grouted or filled in with a hardening mortar or cement in a well-known way. The lower sections of one or more sleeves or collars constituting sockets for the conduit-section are adjusted in proper position in the trench. Hydraulic-cement mortar is then spread along the end edges of the bottom of the sleeve. This being done the conduit-sections are adjusted end to end in the sockets or sleeve-sections. The upper or cap portions of the sleeves are then adjusted in place, after which the seams between the sleeve-sections and between them and the conduit-sections are luted with hydraulic cement, and the joints thus closed and sealed. In doing this the cement is pressed or flows into substantially the form shown at $bb$. The conduit as a whole is then grouted with cement for greater security against dampness and leakage.

Having thus described my invention, I claim—

1. The improvement in the art of laying terra-cotta underground conduits hereinbefore described, which consists in first digging a trench; second, grouting and cementing the bottom thereof; third, laying at intervals therein a segment of a coupling-collar; fourth, placing hydraulic cement along the end edges of the bottom of said collar; fifth, placing the perforated sections or blocks of terra-cotta end to end in the yoke or collar; sixth, adjusting the remaining segment of the collar in place and luting the seams at the sides and top of the conduit with hydraulic cement, whereby a coupling is produced and a joint impervious to water is conveniently obtained, substantially as described.

2. The improvement in the art of laying terra-cotta underground conduits for electric circuits hereinbefore described, which consists in first digging a trench; second, grouting and cementing the bottom; third, laying at intervals a segment of a coupling-collar; fourth, placing hydraulic cement along the end edges of the bottom of said collar; fifth, placing the perforated sections or blocks of terra-cotta end to end in the yoke or collar; sixth, adjusting the remaining segment of the collar in place and luting the seams at the sides and top of the conduit with hydraulic cement, and, finally, grouting the conduit, substantially as described.

In testimony whereof I affix my signature in presence of two witnesses.

WILMOT LAKE.

Witnesses:
R. H. COWAN,
CHAS. W. DARR.